(12) United States Patent
Chen et al.

(10) Patent No.: US 12,738,849 B2
(45) Date of Patent: Sep. 15, 2026

(54) MULTI-LEVEL BOOST POWER CONVERTER CIRCUIT WITH LOW POWER LOSS

(71) Applicant: Richtek Technology Corporation, Hsinchu (TW)

(72) Inventors: Ke-Horng Chen, Hsinchu (TW); Rong-Bin Guo, Hsinchu (TW); Ang-Ching Chuang, Hsinchu (TW); Yen-An Tsai, Hsinchu (TW); Wei-Yao Wan, Hsinchu (TW); Kwan-Jen Chu, Hsinchu (TW); Chia-Jung Chang, Hsinchu (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 133 days.

(21) Appl. No.: 18/967,698

(22) Filed: Dec. 4, 2024

(65) Prior Publication Data

US 2025/0392218 A1 Dec. 25, 2025

Related U.S. Application Data

(60) Provisional application No. 63/661,911, filed on Jun. 20, 2024.

(30) Foreign Application Priority Data

Oct. 23, 2024 (TW) ................................ 113140425

(51) Int. Cl.
*H02M 3/158* (2006.01)
*H02M 1/00* (2006.01)

(52) U.S. Cl.
CPC ......... *H02M 3/158* (2013.01); *H02M 1/0054* (2021.05)

(58) Field of Classification Search
CPC ............................ H02M 3/158; H02M 1/0054
See application file for complete search history.

(56) References Cited

U.S. PATENT DOCUMENTS

| | | | | |
|---|---|---|---|---|
| 6,714,426 | B1 * | 3/2004 | Guo | H02M 3/1584 363/25 |
| 10,686,377 | B1 * | 6/2020 | Lu | H02M 3/158 |
| 2020/0321868 | A1 * | 10/2020 | Michal | H02M 3/07 |
| 2024/0223086 | A1 * | 7/2024 | Liu | H02M 1/0009 |

* cited by examiner

*Primary Examiner* — Rafael O De Leon Domenech
(74) *Attorney, Agent, or Firm* — WPAT, P.C.; Anthony King

(57) ABSTRACT

A multi-level boost power converter circuit includes: at least two high-side switches; at least two low-side switches; a first capacitor; an inductor; and a control circuit configured to generate plural operation signals. The first end of the first capacitor is coupled between the at least two high-side switches, and the second end of the first capacitor is coupled between the at least two low-side switches. One end of the inductor is coupled to the input voltage, and the other end of the inductor is coupled to an inductor switching node, which is connected to either the first or second end of the first capacitor. The plural operation signals are configured to control the at least two high-side switches and the at least two low-side switches, thereby switching the voltage at the inductor switching node between a first divided voltage of the output voltage and the output voltage, or between the first divided voltage of the output voltage and a reference level.

7 Claims, 14 Drawing Sheets

MULTI-LEVEL BOOST POWER CONVERTER CIRCUIT WITH LOW POWER LOSS

CROSS REFERENCE

The present invention claims priority to U.S. 63/661,911 filed on Jun. 20, 2024 and claims priority to TW 113140425 filed on Oct. 23, 2024.

BACKGROUND OF THE INVENTION

Field of Invention

The present invention relates to a multi-level boost power converter circuit, and more particularly, to a multi-level boost power converter circuit that features low power loss, higher efficiency, and a smaller chip size.

Description of Related Art

FIGS. 1A and 1B illustrate a prior art three-level boost power converter circuit. In FIG. 1A, when the converter circuit is in a shutdown state, all switches are turned off. In this condition, when the output voltage drops below the input voltage, the body diodes of the switches conduct, causing leakage current. To prevent such leakage current, prior art adds an additional isolation switch (Mscp), wherein the body diode of the isolation switch Mscp is oriented in reverse to the diodes of other switches, thereby avoiding leakage current. However, as shown in FIG. 1B, in certain operating states of the converter (e.g., when the inductor L discharges to the output voltage Vo), the current must flow through three switches. The increased number of switches in the current path leads to higher conduction power losses, thereby reducing the power conversion efficiency.

In view of the above shortcomings of the prior art, the present invention proposes a multi-level boost power converter circuit that reduces the number of switches in the current path, thereby achieving lower power loss.

SUMMARY OF THE INVENTION

From one perspective, the present invention provides a multi-level boost power converter circuit configured to convert an input voltage to an output voltage. The multi-level boost power converter circuit includes at least two high-side switches, at least two low-side switches, an isolation switch coupled between the at least two high-side switches and the output voltage, wherein the body diode of the isolation switch is oriented in reverse to the body diodes of the at least two high-side switches, a first capacitor, an inductor, and a control circuit configured to generate plural operation signals. A first end of the first capacitor is coupled between the at least two high-side switches, and a second end of the first capacitor is coupled between the at least two low-side switches. One end of the inductor is coupled to the input voltage, and the other end of the inductor is coupled to an inductor switching node, which is connected to either the first end or the second end of the first capacitor. The plural operation signals are configured to control the at least two high-side switches and the at least two low-side switches, thereby switching the voltage at the inductor switching node between a first divided voltage of the output voltage and the output voltage, or between the first divided voltage of the output voltage and a reference potential.

In one preferred embodiment, the at least two high-side switches and the at least two low-side switches are configured as follows: (1) The at least two high-side switches include a first high-side switch and a second high-side switch, and the at least two low-side switches include a first low-side switch and a second low-side switch. The first low-side switch and the first high-side switch are coupled at a capacitor switching node, and the first high-side switch and the second high-side switch are coupled at an inductor switching node. The first low-side switch and the second low-side switch, along with one end of the first capacitor, are coupled to a first node, wherein the other end of the first capacitor is coupled to either the first or second low-side switch. The first divided voltage of the output voltage is half of the output voltage; or (2) The at least two high-side switches include a first high-side switch and a second high-side switch, and the at least two low-side switches include a first low-side switch and a second low-side switch. The first low-side switch and the first high-side switch are coupled at a capacitor switching node, the first low-side switch and the second low-side switch are coupled at the inductor switching node, and the first high-side switch, the second high-side switch, and one end of the first capacitor are coupled to a first node, wherein the other end of the first capacitor is coupled to either the first or second low-side switch. The first divided voltage of the output voltage is half of the output voltage.

In one preferred embodiment, the capacitor switching node is coupled to a second capacitor.

In one preferred embodiment, when the at least two high-side switches and the at least two low-side switches are configured as option (2), the control circuit controls the multi-level boost power converter circuit to periodically switch between a first state and a second state. In the first state, the first low-side switch and the second high-side switch are turned on, while the second low-side switch and the first high-side switch are turned off. This configuration connects the first capacitor and the second capacitor in series between the output voltage and the reference potential, and the inductor is connected between the divided voltage of the first and second capacitors and the input voltage. In the second state, the second low-side switch and the first high-side switch are turned on, while the first low-side switch, the second high-side switch, and the isolation switch are turned off. This configuration connects the first capacitor and the second capacitor in parallel between the first node and the reference potential, and the inductor is connected between the input voltage and the reference potential.

In one preferred embodiment, when the at least two high-side switches and the at least two low-side switches are configured as option (1), the control circuit controls the multi-level boost power converter circuit to periodically switch between a third state and a fourth state. In the third state, the first low-side switch and the second high-side switch are turned on, while the second low-side switch and the first high-side switch are turned off. This configuration connects the first capacitor and the second capacitor in series between the output voltage and the reference potential, and the inductor is connected between the input voltage and the output voltage. In the fourth state, the second low-side switch and the first high-side switch are turned on, while the first low-side switch, the second high-side switch, and the isolation switch are turned off. This configuration connects the first capacitor and the second capacitor in parallel between the inductor switching node and the reference potential, and the inductor is connected between the parallel voltage of the first and second capacitors and the input voltage.

In one preferred embodiment, when the at least two high-side switches and the at least two low-side switches are configured as option (1), the input voltage is between the output voltage and half of the output voltage. When the at least two high-side switches and the at least two low-side switches are configured as option (2), the input voltage is less than half of the output voltage.

In one preferred embodiment, the multi-level boost power converter circuit includes an optional shutdown mode. In the shutdown mode, the at least two high-side switches, the at least two low-side switches, and the isolation switch are all turned off to disable the output voltage, and when the output voltage is lower than the input voltage, the body diodes of the at least two high-side switches, the at least two low-side switches, and the isolation switch are all in an off state.

The present invention is advantageous in lower power loss, higher efficiency, and a smaller chip size.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
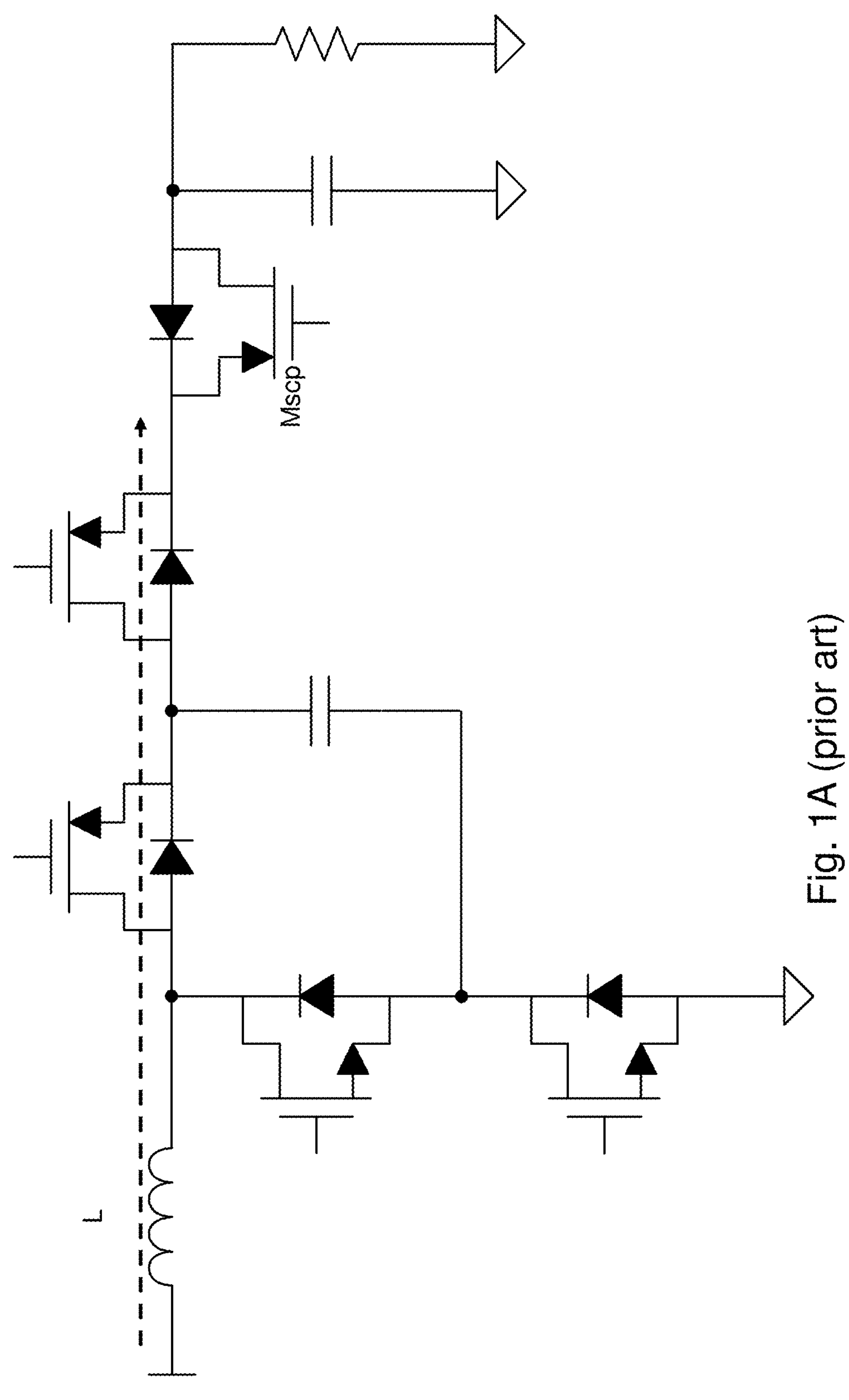
FIGS. 1A and 1B show a prior art three-level boost power converter circuit.
Figure 1B:
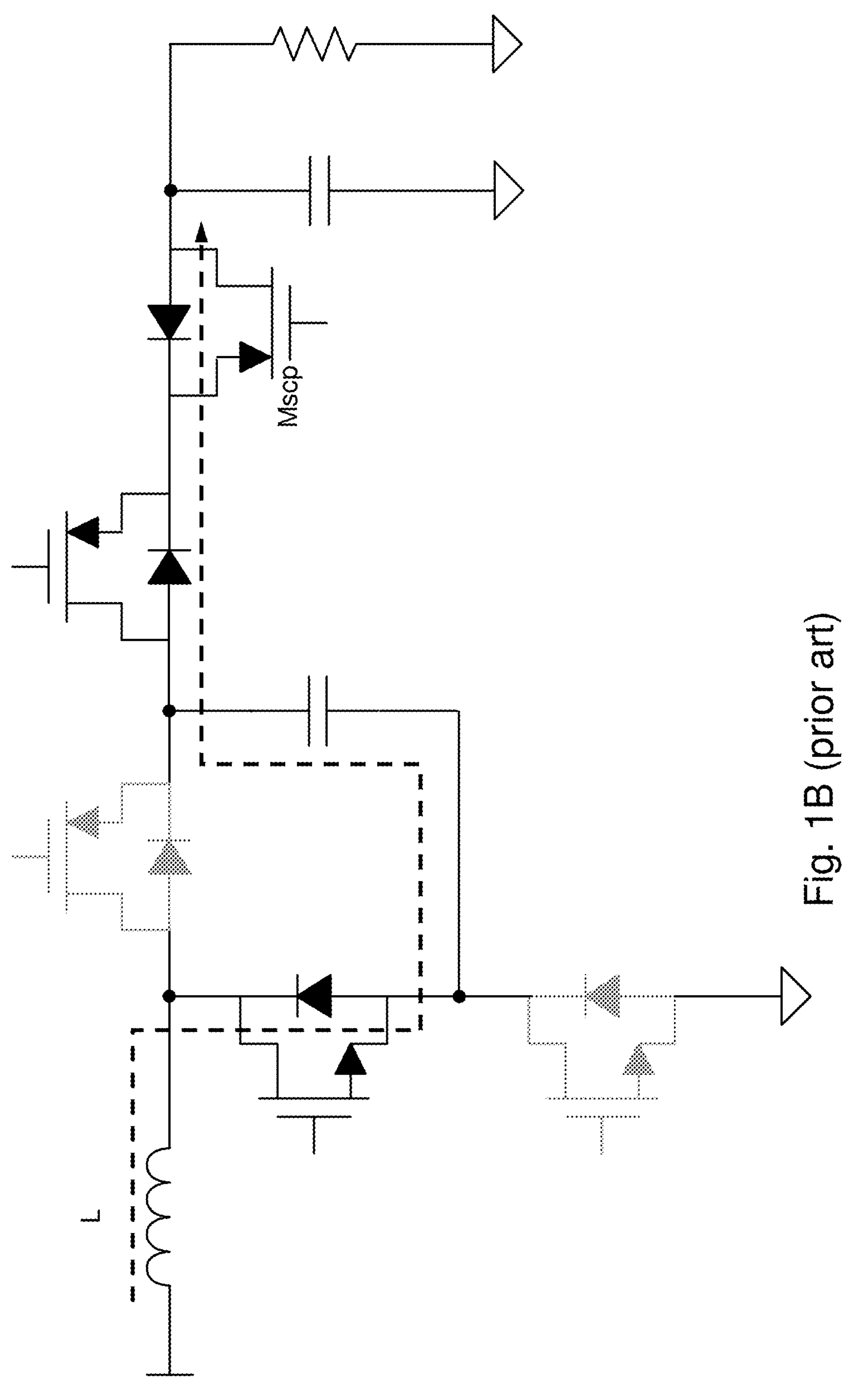
Figure 2:
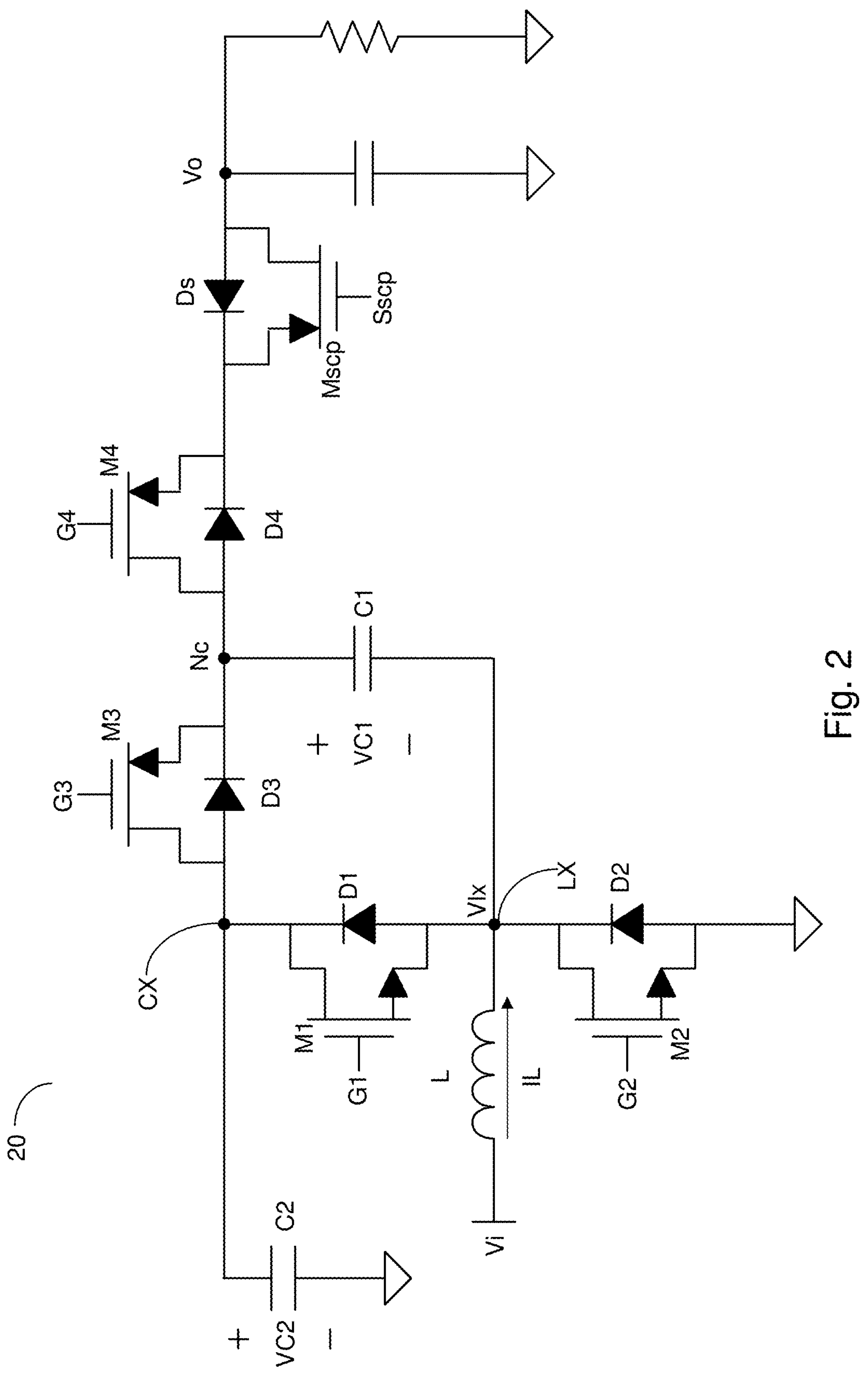
FIG. 2 shows a schematic diagram of a multi-level boost power converter circuit according to one embodiment of the present invention.

FIG. 2 shows a schematic diagram of a multi-level boost power converter circuit according to one embodiment of the present invention. As shown in FIG. 2, the multi-level boost power converter circuit 20 of the present invention is configured to convert an input voltage Vi to an output voltage Vo. The multi-level boost power converter circuit 20 includes at least two high-side switches M3 and M4, at least two low-side switches M1 and M2, a capacitor C1, an inductor L, and an isolation switch Mscp. A first end of capacitor C1 is coupled between the at least two high-side switches (e.g., M3 and M4), while a second end of capacitor C1 is coupled between the at least two low-side switches (e.g., M1 and M2). One end of the inductor L is coupled to the input voltage Vi, and the other end of the inductor L is coupled to the inductor switching node LX, which is connected to the second end of capacitor C1. The isolation switch Mscp is coupled between the at least two high-side switches M3, M4, and the output voltage Vo. The body diode Ds of the isolation switch Mscp is oriented in reverse to the body diodes D3 and D4 of the high-side switches M3 and M4.

Specifically, in this embodiment, the low-side switch M1 and the high-side switch M3 are coupled at a capacitor switching node CX, while the low-side switch M1 and the low-side switch M2 are coupled at the inductor switching node LX. The high-side switches M3 and M4 are coupled at node Nc. In one embodiment, the multi-level boost power converter circuit 20 further includes a capacitor C2, which is coupled between the capacitor switching node CX and a reference potential. In one embodiment, in steady state, the voltage across capacitor C1 (VC1) equals the voltage across capacitor C2 (VC2). In this embodiment, both VC1 and VC2 are equal to half of the output voltage Vo.

Figure 3:
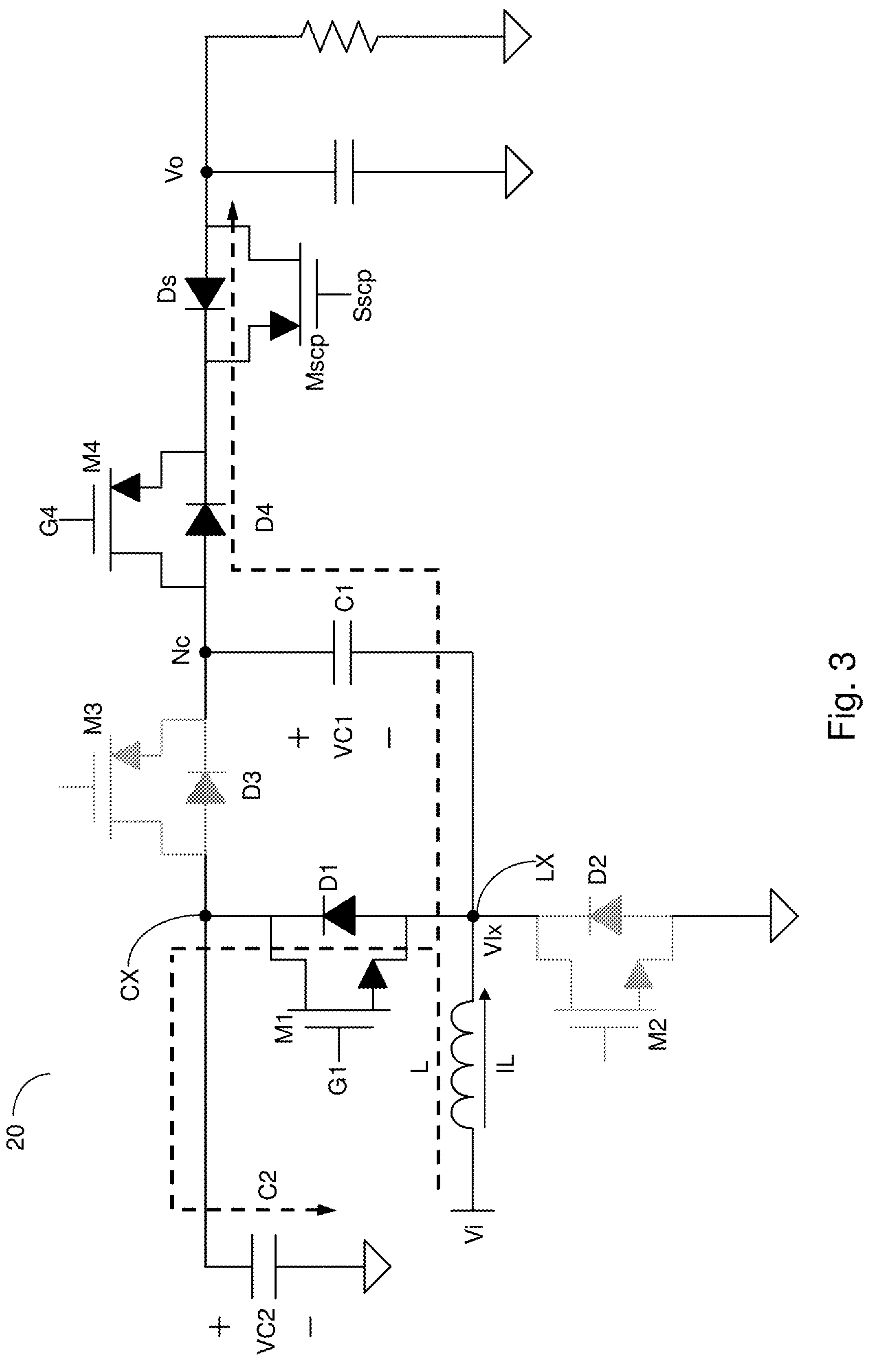
FIGS. 3 to 5 show schematic diagrams and operational diagrams of a multi-level boost power converter circuit according to embodiments of the present invention.
Figure 4:
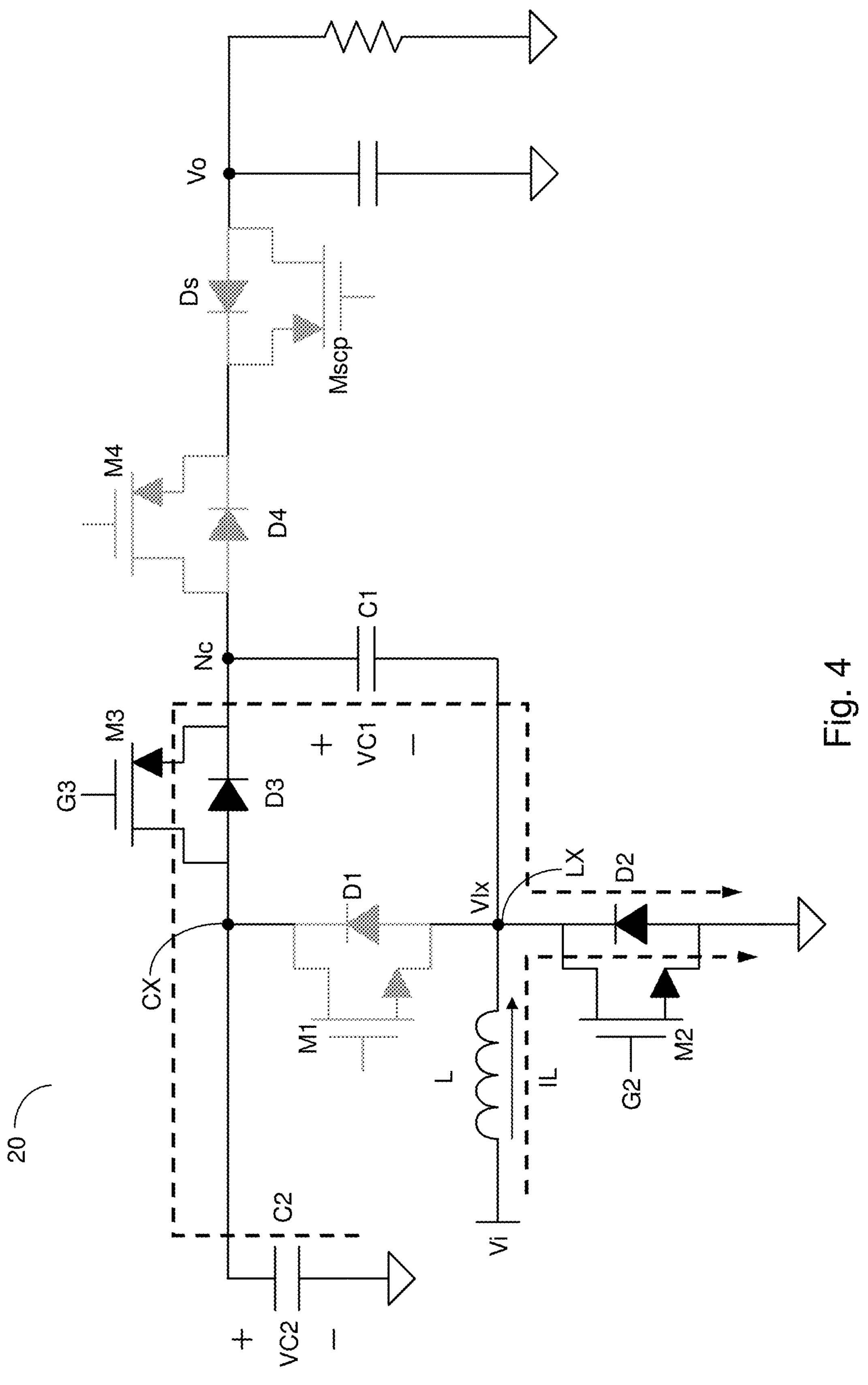
Figure 5:
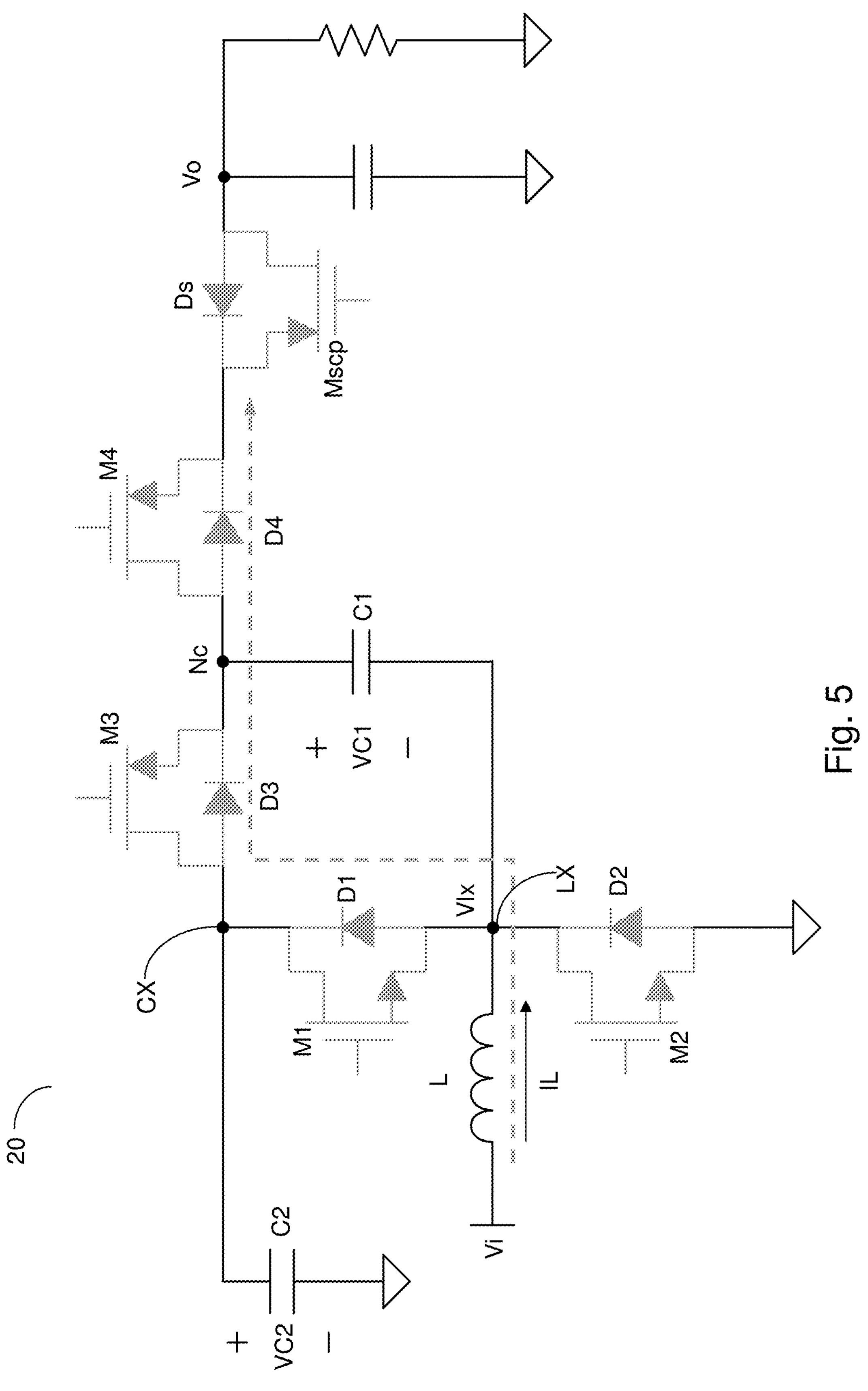
Figure 11:
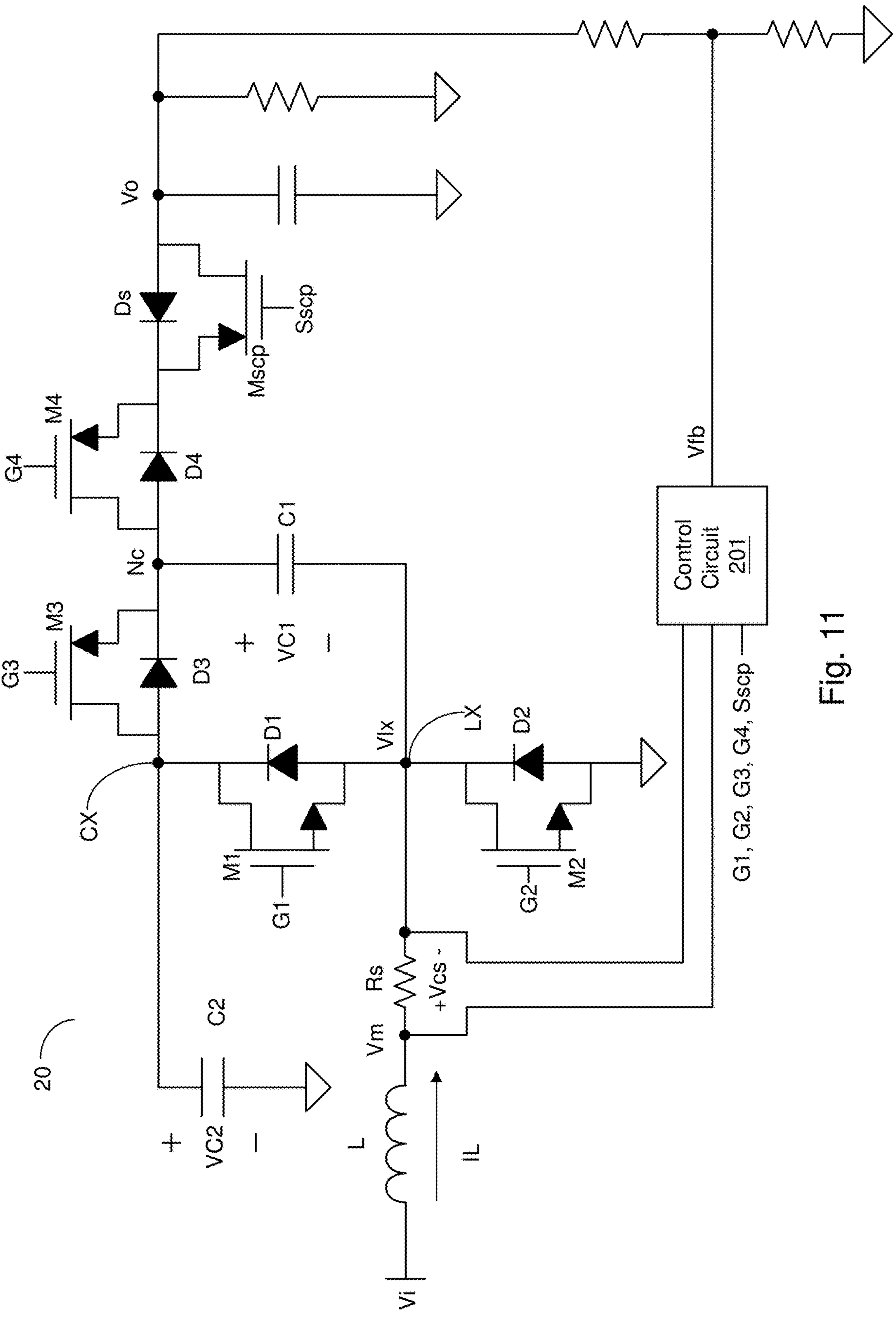
FIG. 11 shows a schematic diagram of a multi-level boost power converter circuit according to one embodiment of the present invention.

FIGS. 3 to 5 show schematic diagrams and operational diagrams of a multi-level boost power converter circuit according to embodiments of the present invention. Referring to FIGS. 3 and 11, the control circuit 201 periodically switches the multi-level boost power converter circuit 20 between a first state and a second state. As shown in FIG. 3, in the first state, the operation signals G1, G4, and Sscp are controlled to an enabled level, while the operation signals G2 and G3 are controlled to a disabled level. Consequently, the low-side switch M1, the high-side switch M4, and the isolation switch Mscp are turned on, while the low-side switch M2 and the high-side switch M3 are turned off (the off state is represented in gray, hereinafter the same). In this state, the capacitors C1 and C2 are electrically connected in series between the output voltage Vo and the reference potential, and the inductor L is electrically connected between the divided voltage of capacitors C1 and C2 and the input voltage Vi. The reference potential may, for example, be ground. When the switching operation achieves steady state, the voltage Vlx at the inductor switching node is half of the output voltage Vo (i.e., the divided voltage of C1 and C2 during steady state) in the first state.

As shown in FIG. 4, in the second state, the operation signals G1, G4, and Sscp are controlled to a disabled level, while the operation signals G2 and G3 are controlled to an enabled level. Consequently, the low-side switch M2 and the high-side switch M3 are turned on, while the low-side switch M1, the high-side switch M4, and the isolation switch Mscp are turned off. In this state, the capacitors C1 and C2 are electrically connected in parallel between node Nc and the reference potential, and the inductor L is electrically connected between the input voltage Vi and the reference potential. When the switching operation achieves steady state, the voltage Vlx at the inductor switching node is 0 in the second state.

From FIGS. 3 and 4, it is shown that, whether in the first state or the second state, the inductor current IL flows through at most two switches, thereby reducing conduction power loss. On the other hand, as shown in FIG. 5, the multi-level boost power converter circuit 20 includes an optional shutdown mode. In the shutdown mode, the high-side switches M3 and M4, the low-side switches M1 and M2, and the isolation switch Mscp are all turned off to shut down the output voltage Vo, allowing the output voltage Vo to drop below the input voltage Vi. Due to the reverse orientation of the body diode Ds of the isolation switch Mscp relative to the body diodes of the other switches, none of the body diodes of the switches M3, M4, M1, M2, and Mscp conducts forward (i.e., all of them remain off), thus avoiding leakage current as represented by the gray dashed lines.

Figure 6:
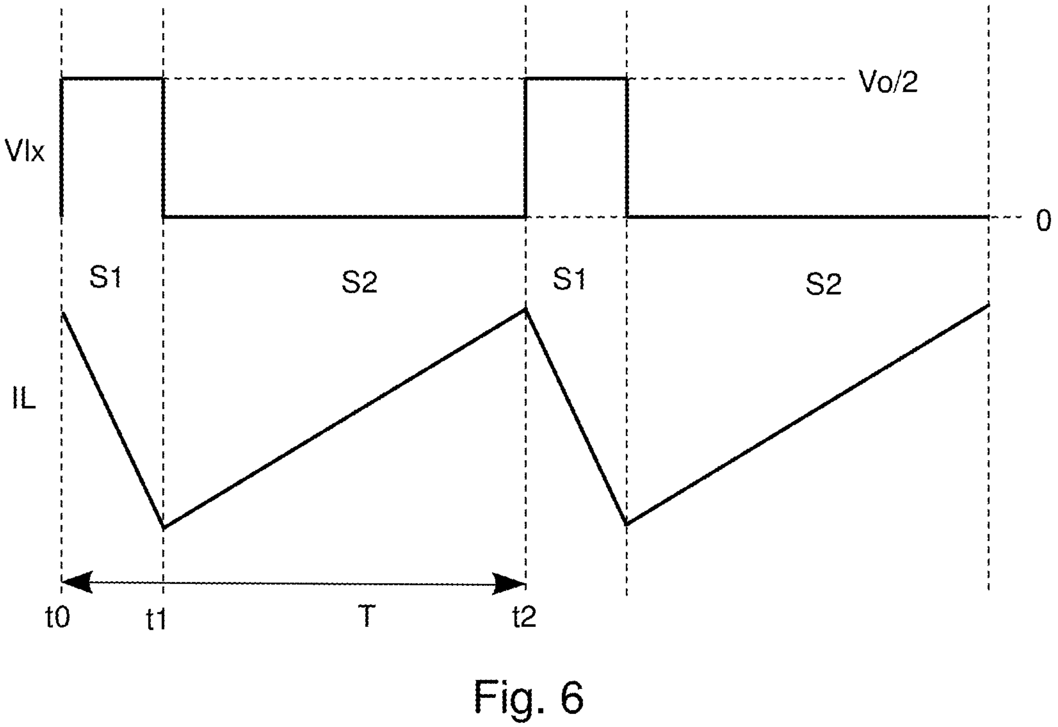
FIG. 6 shows signal waveforms of related signals of a multi-level boost power converter circuit according to one embodiment of the present invention.

FIG. 6 shows signal waveforms of related signals of a multi-level boost power converter circuit according to one embodiment of the present invention. The voltage Vlx at the inductor switching node and the inductor current IL are shown in FIG. 6. As illustrated, the voltage Vlx at the inductor switching node alternates between 0 and half of the output voltage Vo. During the time interval from t0 to t1 in the switching period T, when the multi-level boost power converter circuit 20 is in the first state S1, the voltage Vlx at the inductor switching node is half of the output voltage Vo, causing the inductor current IL ramping down. During the time interval from t1 to t2 in the switching period T, when the multi-level boost power converter circuit 20 is in the second state S2, the voltage Vlx at the inductor switching node is 0, causing the inductor current IL ramping up. It should be noted that the embodiments illustrated in FIGS. 2 to 6 are applicable to cases where the input voltage Vi is less than half of the output voltage Vo.

Figure 7:
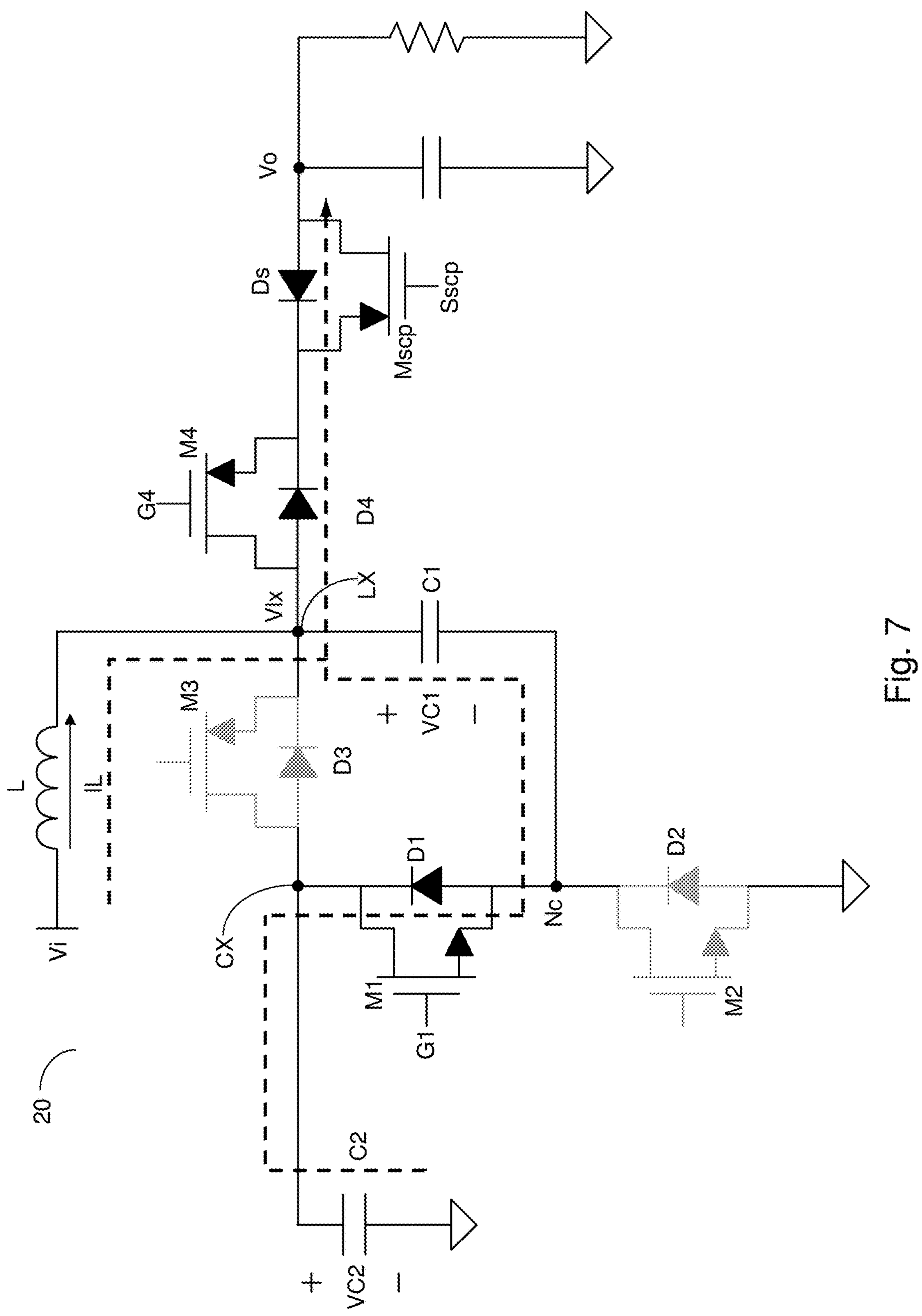
FIGS. 7 to 9 show schematic diagrams and operational diagrams of a multi-level boost power converter circuit according to another embodiment of the present invention.
Figure 8:
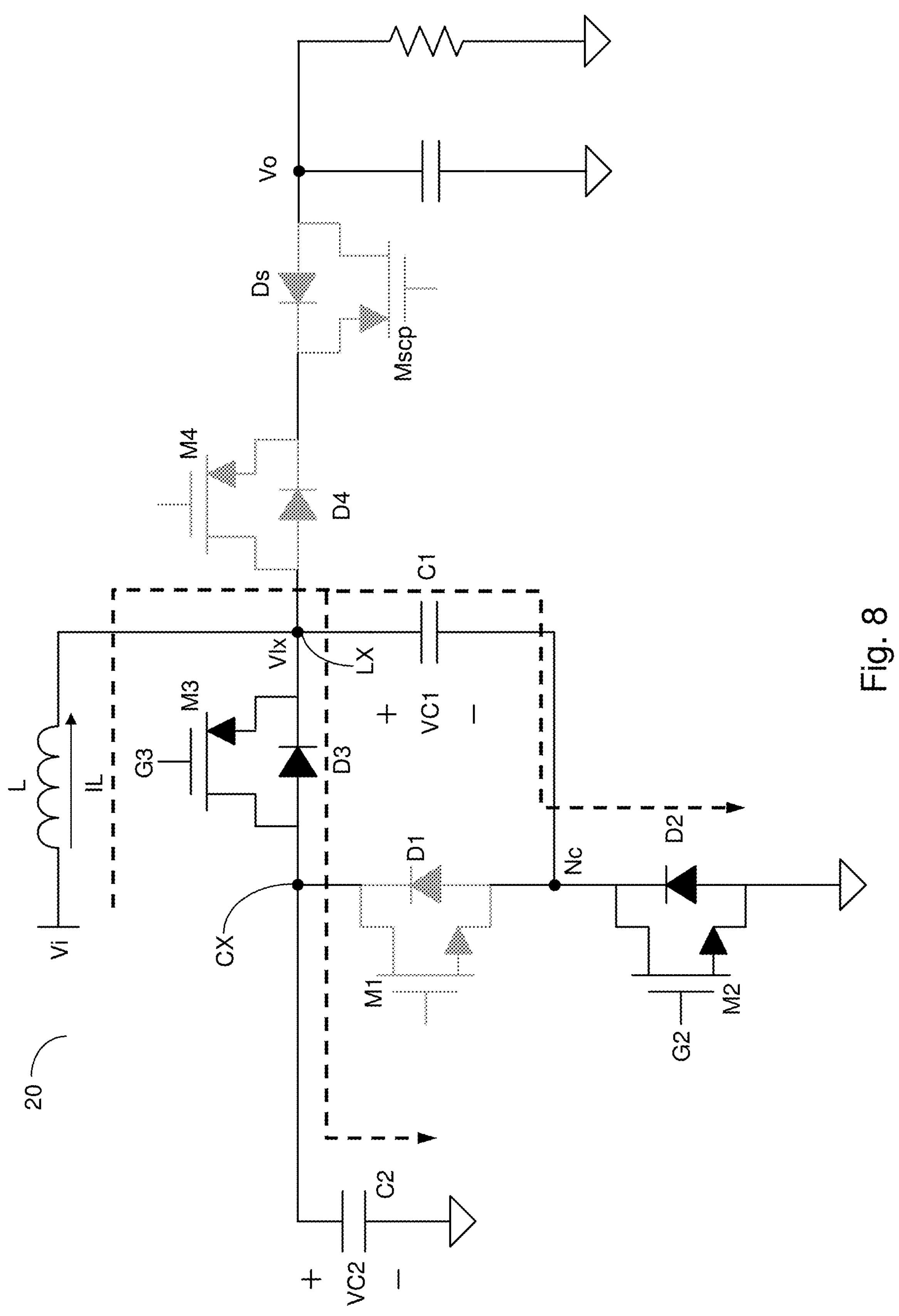
Figure 9:
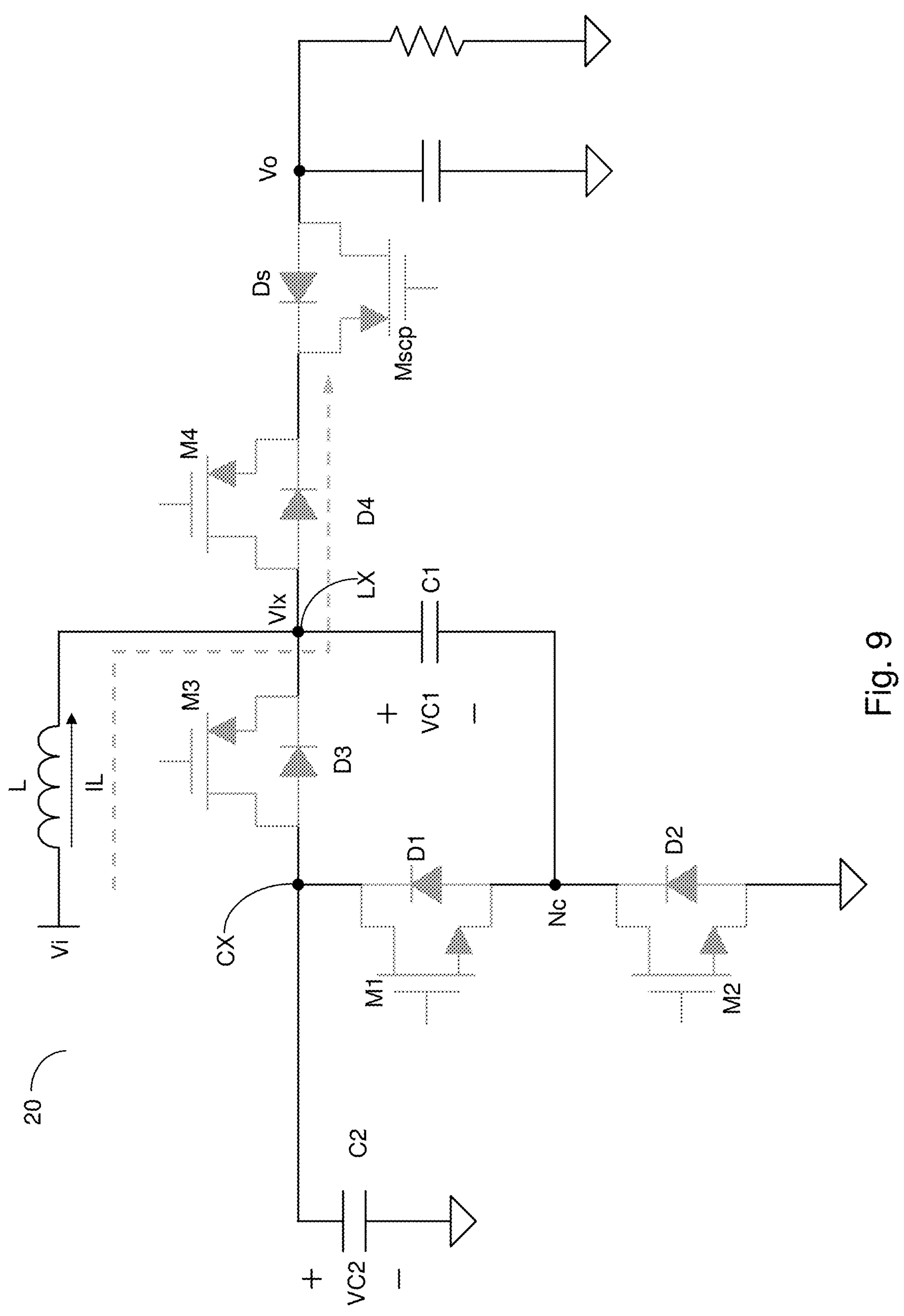

FIGS. 7 to 9 show schematic diagrams and operational diagrams of a multi-level boost converter circuit according to another embodiment of the present invention. As shown in FIG. 7, this embodiment is similar to the embodiment shown in FIG. 2, with the difference being that in this embodiment, the other end of the inductor L is coupled to the first end of capacitor C1 at the inductor switching node LX. The high-side switches M3 and M4 are coupled to the inductor switching node LX, while the low-side switches M1 and M2 are coupled to node Nc.

Referring to FIGS. 7 and 11, the control circuit 201 periodically switches the multi-level boost power converter circuit 20 between a third state and a fourth state. As shown in FIG. 7, in the third state, the operation signals G1, G4, and Sscp are controlled to an enabled level, while the operation signals G2 and G3 are controlled to a disabled level. Consequently, the low-side switch M1, the high-side switch M4, and the isolation switch Mscp are turned on, while the low-side switch M2 and the high-side switch M3 are turned off. In this state, the capacitors C1 and C2 are electrically connected in series between the output voltage Vo and the reference potential, and the inductor L is electrically connected between the input voltage Vi and the output voltage Vo. When the switching operation achieves steady state, the voltage Vlx at the inductor switching node is equal to the output voltage Vo in the third state.

As shown in FIG. 8, in the fourth state, the operation signals G1, G4, and Sscp are controlled to a disabled level, while the operation signals G2 and G3 are controlled to an enabled level. Consequently, the low-side switch M2 and the high-side switch M3 are turned on, while the low-side switch M1, the high-side switch M4, and the isolation switch Mscp are turned off. In this state, the capacitors C1 and C2 are electrically connected in parallel between the inductor switching node LX and the reference potential, and the inductor L is electrically connected between the parallel voltage of capacitors C1 and C2 and the input voltage Vi. When the switching operation achieves steady state, the voltage Vlx at the inductor switching node is half of the output voltage Vo (i.e., the steady state parallel voltage of C1 and C2) in the fourth state.

From FIGS. 7 and 8, it is shown that, whether in the third state or the fourth state, the inductor current IL flows through at most two switches, thereby reducing conduction power loss. As shown in FIG. 9, the multi-level boost power converter circuit 20 includes an optional shutdown mode. In the shutdown mode, the high-side switches M3 and M4, the low-side switches M1 and M2, and the isolation switch Mscp are all turned off to shut down the output voltage Vo, allowing it to drop below the input voltage Vi. Due to the reverse orientation of the body diode Ds of the isolation switch Mscp relative to the body diodes of the other switches, none of the body diodes of the switches M3, M4, M1, M2, and Mscp conducts forward, thus avoiding leakage current as represented by the gray dashed lines.

Figure 10:
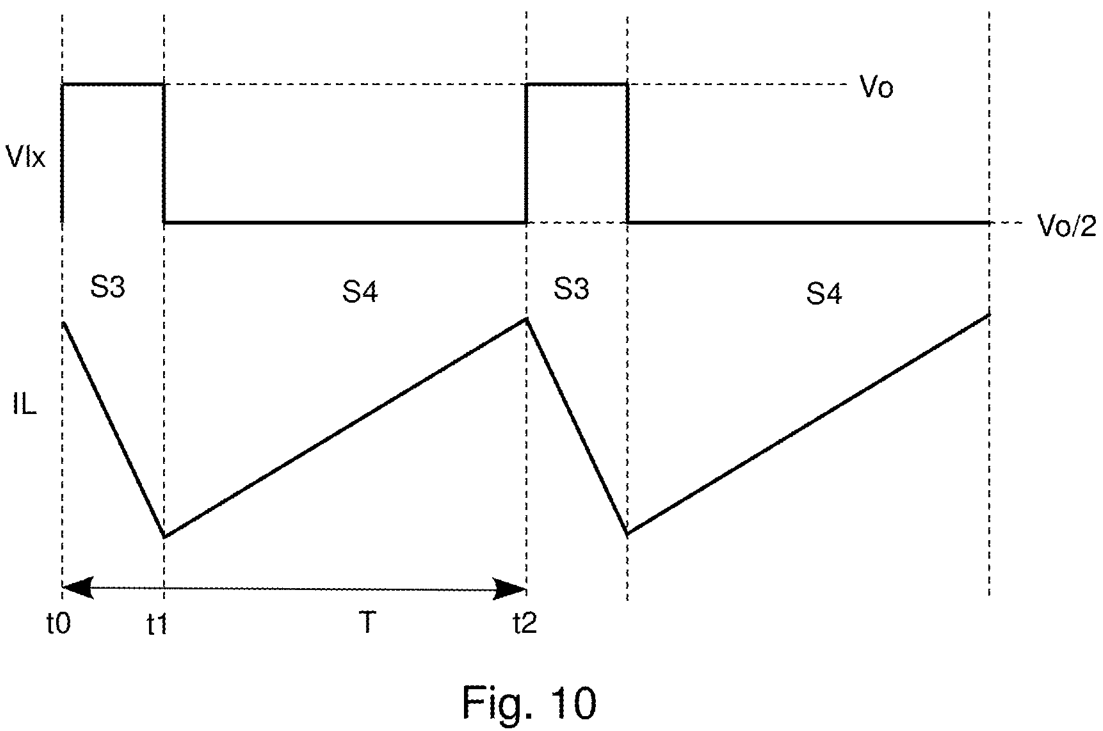
FIG. 10 shows signal waveforms of related signals of a multi-level boost power converter circuit according to another embodiment of the present invention.

FIG. 10 shows signal waveforms of related signals of a multi-level boost power converter circuit according to another embodiment of the present invention. The voltage Vlx at the inductor switching node and the inductor current IL are shown in FIG. 10. As illustrated, the voltage Vlx alternates between the output voltage Vo and half of the output voltage Vo. During the time interval from t0 to t1 in the switching period T, when the multi-level boost power converter circuit 20 is in the third state S3, the voltage Vlx at the inductor switching node is equal to the output voltage Vo, causing the inductor current IL ramping down. During the time interval from t1 to t2 in the switching period T, when the multi-level boost power converter circuit 20 is in the fourth state S4, the voltage Vlx at the inductor switching node is half of the output voltage Vo, causing the inductor current IL ramping up. It should be noted that the embodiments illustrated in FIGS. 7 to 10 are applicable to cases where the input voltage Vi is between the output voltage Vo and half of the output voltage Vo.

FIG. 11 shows a schematic diagram of a multi-level boost power converter circuit according to one embodiment of the present invention. As shown in FIG. 11, the control circuit 201 generates plural operation signals G1, G2, G3, G4, and Sscp based on a feedback signal Vfb related to the output voltage Vo and a signal Vcs related to the inductor current. In this embodiment, the signal Vcs is the voltage across a current sensing resistor Rs. The plural operation signals G1, G2, G3, G4 are configured to control the at least two high-side switches M3, M4 and the at least two low-side switches M1, M2 to switch the voltage Vlx at the inductor switching node between a first divided voltage of the output voltage Vo and the output voltage Vo, or between the first divided voltage of the output voltage Vo and a reference potential. In one embodiment, the first divided voltage of the output voltage Vo is half of the output voltage Vo.

Figure 12:
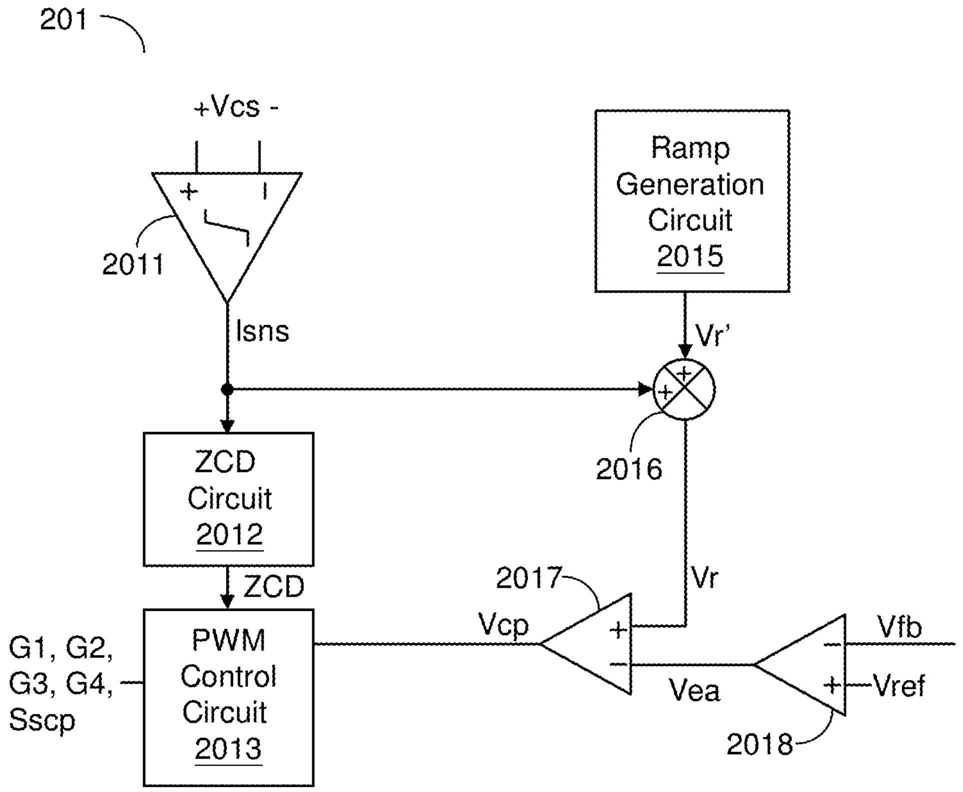
FIG. 12 shows a block diagram of a control circuit of a multi-level boost power converter circuit according to one embodiment of the present invention.

FIG. 12 shows a block diagram of the control circuit of a multi-level boost power converter circuit according to one embodiment of the present invention. This embodiment provides an exemplary implementation of the control circuit 201 shown in FIG. 11. As illustrated in FIG. 12, the control circuit 201 includes a current sensing circuit 2011, a zero-current detection circuit 2012, a pulse width modulation (PWM) control circuit 2013, a ramp generation circuit 2015, an adder circuit 2016, a comparator 2017, and an error amplifier 2018. Referring to both FIGS. 11 and 12, the current sensing circuit 2011 senses the inductor current IL via the signal Vcs and generates a current sensing signal Isns. The zero-current detection circuit 2012 generates a zero-current detection signal ZCD based on the current sensing signal Isns, where the ZCD signal indicates the time point when the inductor current IL reaches zero. The ramp generation circuit 2015 generates a ramp signal Vr'. The adder circuit 2016 superimposes the ramp signal Vr' onto the current sensing signal Isns to generate a ramp signal Vr. The error amplifier 2018 generates an error signal Vea based on the feedback signal Vfb related to the output voltage Vo and a reference signal Vref. The comparator 2017 compares the error signal Vea with the ramp signal Vr to generate a comparison result Vcp. The PWM control circuit 2013 generates the operation signals G1, G2, G3, G4, and Sscp with pulse-width modulation characteristics based on the ZCD signal and the comparison result Vcp.

Figure 13:
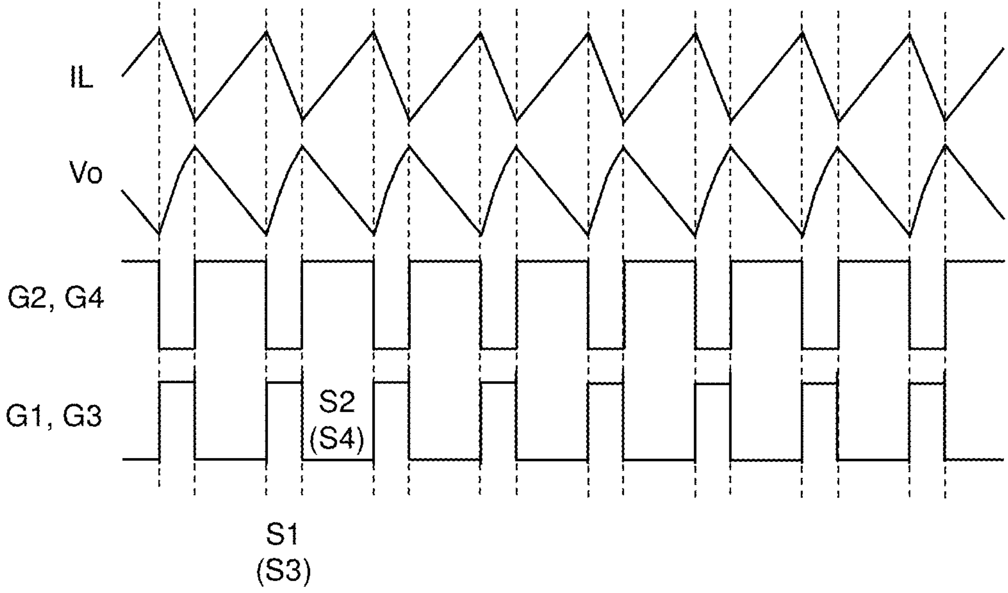
FIG. 13 shows signal waveforms of related signals of a multi-level boost power converter circuit according to one embodiment of the present invention.

FIG. 13 shows signal waveforms of related signals of a multi-level boost power converter circuit according to one embodiment of the present invention. The inductor current IL, the output voltage Vo, and the operation signals G1, G2, G3, G4 are shown in FIG. 13. The aforementioned first state S1 or third state S3 corresponds to the operation signals G1 and G4 being in the enabled state and the disabled state (i.e., G1=1, G4=0) respectively. The aforementioned second state S2 or fourth state S4 corresponds to the operation signals G2 and G3 being in the enabled state and the disabled state (G2=1, G3=0) respectively.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be configured together, or, a part of one embodiment can be configured to replace a corresponding part of another embodiment. In view of the foregoing, the spirit of the present invention should cover all such and other modifications and variations, which should be interpreted to fall within the scope of the following claims and their equivalents.

What is claimed is:

1. A multi-level boost power converter circuit configured to convert an input voltage to an output voltage, comprising:

at least two high-side switches;

at least two low-side switches;

an isolation switch coupled between the at least two high-side switches and the output voltage, wherein a body diode of the isolation switch is reversely oriented with respect to body diodes of the at least two high-side switches;

a first capacitor;

an inductor; and a control circuit configured to generate plural operation signals;

wherein a first end of the first capacitor is coupled between the at least two high-side switches, and a second end of the first capacitor is coupled between the at least two low-side switches;

wherein one end of the inductor is coupled to the input voltage, and the other end of the inductor is coupled to an inductor switching node connected to either the first end or the second end of the first capacitor;

wherein the plural operation signals are configured to control the at least two high-side switches and the at least two low-side switches to switch the voltage at the inductor switching node between a first divided voltage of the output voltage and the output voltage, or between the first divided voltage of the output voltage and a reference level.

2. The multi-level boost power converter circuit of claim 1, wherein the at least two high-side switches and the at least two low-side switches are configured as follows:

(1) wherein the at least two high-side switches include a first high-side switch and a second high-side switch, and the at least two low-side switches include a first low-side switch and a second low-side switch, The first low-side switch and the first high-side switch are coupled at a capacitor switching node, and the first high-side switch and the second high-side switch are coupled at the inductor switching node, and the first low-side switch (M1) and the second low-side switch (M2), along with the other end of the first capacitor (C1), are coupled to a first node (Nc), wherein the first divided voltage of the output voltage is half of the output voltage; or (2) The at least two high-side switches include a first high-side switch and a second high-side switch, and the at least two low-side switches include a first low-side switch and a second low-side switch, The first low-side switch and the first high-side switch are coupled at a capacitor switching node, the first low-side switch and the second low-side switch are coupled at the inductor switching node, and the first high-side switch and the second high-side switch, along with the other end of the first capacitor, are coupled at the first node, wherein the first divided voltage of the output voltage is half of the output voltage.

3. The multi-level boost power converter circuit of claim 2, wherein the capacitor switching node is coupled to a second capacitor.

4. The multi-level boost power converter circuit of claim 3, wherein when the at least two high-side switches and the at least two low-side switches are configured as option (2), the control circuit controls the multi-level boost power converter circuit to periodically switch between a first state and a second state, wherein:

in the first state, the first low-side switch and the second high-side switch are turned on, while the second low-side switch and the first high-side switch are turned off, such that the first capacitor and the second capacitor are electrically connected in series between the output voltage and the reference level, and the inductor is electrically connected between the first divided voltage of the first and second capacitors and the input voltage; and in the second state, the second low-side switch and the first high-side switch are turned on, while the first low-side switch and the second high-side switch are turned off, such that the first capacitor and the second capacitor are electrically connected in parallel between the first node and the reference level, and the inductor is electrically connected between the input voltage and the reference level.

5. The multi-level boost power converter circuit of claim 3, wherein when the at least two high-side switches and the at least two low-side switches are configured as option (1), the control circuit controls the multi-level boost power converter circuit to periodically switch between a third state and a fourth state, wherein:

in the third state, the first low-side switch and the second high-side switch are turned on, while the second low-side switch and the first high-side switch are turned off, such that the first capacitor and the second capacitor are electrically connected in series between the output voltage and the reference level, and the inductor is connected electrically between the input voltage and the output voltage; and in the fourth state, the second low-side switch and the first high-side switch are turned on, while the first low-side switch and the second high-side switch are turned off, such that the first capacitor and the second capacitor are electrically connected in parallel between the inductor switching node and the reference level, and the inductor is electrically connected between the parallel voltage of the first and second capacitors and the input voltage.

6. The multi-level boost power converter circuit of claim 2, wherein:

when the at least two high-side switches and the at least two low-side switches are configured as option (1), the input voltage is between the output voltage and half of the output voltage;

when the at least two high-side switches and the at least two low-side switches are configured as option (2), the input voltage is less than half of the output voltage.

7. The multi-level boost power converter circuit of claim 1, wherein the multi-level boost power converter circuit includes an optional shutdown mode, wherein in the shutdown mode, the at least two high-side switches, the at least two low-side switches, and the isolation switch are all turned off to disable the output voltage, and when the output voltage is lower than the input voltage, the body diodes of the at least two high-side switches, the at least two low-side switches, and the isolation switch are all in an off state.

* * * * *